United States Patent [19]
Tsubota

[11] 4,299,201
[45] Nov. 10, 1981

[54] SOLAR ENERGY FOCUSING MEANS

[76] Inventor: Junjiro Tsubota, 2392, Jindaiji-machi, Chofu-shi, Tokyo 182, Japan

[21] Appl. No.: 50,099

[22] Filed: Jun. 19, 1979

[51] Int. Cl.³ .............................................. F24J 3/02
[52] U.S. Cl. ..................................... 126/440; 126/442
[58] Field of Search ......................... 126/440, 446, 450

[56] References Cited

U.S. PATENT DOCUMENTS

| | | | |
|---|---|---|---|
| 3,125,091 | 3/1964 | Sleeper, Jr. | 126/426 |
| 4,057,048 | 11/1977 | Maine | 126/440 |
| 4,069,812 | 1/1978 | O'Neill | 126/440 |
| 4,116,223 | 9/1978 | Vasilantone | 126/440 |
| 4,134,393 | 1/1979 | Stark et al. | 126/440 |
| 4,136,670 | 1/1979 | Davis | 126/441 |
| 4,144,873 | 3/1979 | Blanton | 126/440 |
| 4,147,561 | 4/1979 | Knight | 126/440 |
| 4,171,695 | 10/1979 | Sletten | 126/440 |
| 4,194,949 | 3/1980 | Stark | 126/432 |

Primary Examiner—Stephen P. Garbe
Attorney, Agent, or Firm—Shoemaker and Mattare, Ltd.

[57] ABSTRACT

A highly efficient solar focusing means being hollow and in semi-cylindrical or arcuate shape, the surface of which has such fine menisci as to act like convex lenses to focus solar rays towards the center of the focusing body, irrespective of the position of the sun, where a solar energy conversion device is located and further acts to disperse light reflected thereonto from the solar energy conversion device. The focusing body can assume several shapes and thus can be used for roofing of a building, such as a house, or the like, and still be aesthetically pleasing.

12 Claims, 11 Drawing Figures

SOLAR ENERGY FOCUSING MEANS

BACKGROUND OF THE INVENTION

The present invention relates in general to solar collectors, and, more particularly, to solar energy focusing means used with solar collectors.

There are many types of solar focusing means available for use in solar collector systems which convert solar energy into usable power. An example of a solar energy collector is described in U.S. Pat. No. 3,987,784.

One drawback to presently known solar focusing means is the practical difficulties or non-adaptabilities thereof to use on residential buildings, such as houses, or the like. These known focusing means are aesthetic liabilities, that is, they do not fit in well with an overall aesthetic effect created for the building. In fact, most known solar focusing means must be hidden, if possible. If not hidden, these solar focusing means are immediately noticeable and often severely detract from an otherwise pleasing design. Thus, to take full advantage of solar energy, there is need for a solar focusing means which not only is an aesthetic asset, but also can be used to enhance the beauty and overall appearance of a building.

Another drawback to presently known solar collector systems is the vulnerability to rough weather such as typhoons or the like, when installed on a building. Thus, it is desirable to integrate a solar collector device into the roof of a building in such a way as to constitute part of it in a useful way.

Another major problem for presently known solar collector systems is the low efficiency in energy conversion and utility, which can be improved when the density of the solar energy is condensed. This improvement is particularly necessary for practical use of solar energy collecting systems in the areas of high latitude, such as the northern part of the United States in winter time.

Yet another problem for presently known solar collector systems lies in the cost-effectiveness thereof. To solve this problem, there is need for making a solar focusing body which not only acts as a solar collector, but also performs other functions, such as roofing of a building or shielding of an outer wall.

One of the technical problems associated with known solar collecting systems of a high efficiency is a necessity of complicated mechanisms for pursuing the position of the sun. Thus, there is need for dispensing with such complications, while retaining high efficiency.

Another technical problem associated with known solar collecting systems is an inevitable energy loss by way of re-radiation from the surface of a solar trapping device. Thus, there is need for minimizing such energy loss to increase overall efficiency of an entire system.

SUMMARY OF THE INVENTION

The solar focusing means embodying the teachings of the present invention provides a highly efficient and cost effective solar collecting device and is yet aesthetically pleasing in appearance, and can be easily integrated into a roof or wall of a building so as to constitute part of it.

The preferred form of the focusing body is that of a Spanish-style roof tile. Thus, in the preferred form, the focusing body is semi-cylindrical in shape. The focusing body has certain multiple fine menisci defined on the surface of that focusing body which constitute centripetally arranged multiple focuses so that multiple focused beams apply at all times when the sun shines, irrespective of the position of the sun, onto a portion of an energy trapping unit of a solar energy conversion system, and thus condense the density of solar energy and yet can dispense with complicated mechanisms to pursue the position of the sun which are otherwise necessary for effectively condensing and receiving solar rays, as in some conventional solar collecting devices. Furthermore, the centripetal focusing of multiple beams can materially reduce the surface area of a solar trapping device and minimize energy loss by way of re-radiation. Thus, the solar focusing means embodying the teachings of the present invention enable a high condensation of solar energy at all times during daylight without using any mechanical means and at the same time minimize re-radiation quantity and resulting energy loss by centripetally applying solar rays upon focusing them in multiple beams.

A plurality of fine menisci on the inner surface of the focusing body are designed and arranged in such ways as to act like multiple convex lenses for incident solar rays to focus that solar energy onto a solar energy conversion device such as a pipe having heat transfer fluid flowing therethrough to heat that fluid. Such menisci on the surface also act to spread light reflected upon the inner surface from within the focusing body, which effectively disperses the light reflected by such heat transfer pipe while focusing incident light onto that pipe.

The reflected light is produced primarily by reflection from the pipes or other solar energy conversion devices enclosed within the focusing body. Dispersing that reflected light permits the overall focusing body to take on a color corresponding to that of the pipe or other solar trapping means. Thus, for example, if black heat exchange pipes are contained within the focusing means, the entire focusing body will have a black appearance to a viewer outside of the focusing body due to the dispersing of reflected light by the focusing means. Thus, a roof will have a black color, and if the focusing body is in the style of a Spanish roof tile, the overall roof will have a Spanish appearance. Such a design is highly desirable and aesthetically pleasing. If the pipes of the heat exchange system are copper, the entire roof will take on a copper cast, again, a very desirable result. The support on which the pipes are mounted may, if desired, be used to influence the overall color of the design.

The solar focusing means of the present invention can be formed in other shapes as well, and thus, architects can use a wide variety of roof styles.

OBJECTS OF THE INVENTION

It is, therefore, a main object of the present invention to provide highly efficient solar energy focusing means which are also aesthetically pleasing in outward appearance.

It is another object of the present invention to provide solar energy focusing means which can present an outward appearance of a roof tile and function as such so as to constitute part of a roof structure or outer wall of a building.

It is another object of the present invention to dispense with complicated mechanical means of pursuing the position of the sun for achieving higher efficiency in solar collection and thus to simplify in entirety a solar collecting system, yet retaining high efficiency.

It is another object of the present invention to minimize energy loss by way of re-radiation from the surface of a solar trapping means and enhance overall efficiency of a solar collecting system.

It is another object of the present invention to enable integrating a solar collecting system in a building so as to constitute part of it in useful ways, such as forming the roof or outer wall thereof, so that it can not only be aesthetically pleasing, but also withstand rough weather and can further prevent the building from being heated up by solar energy, particularly in summertime, by way of taking out solar energy for conversion thereof into useful utilities of energy, as well as acting as an adiabatic means of a building by way of providing confined air space within a solar focusing body which embodies the present invention.

These together with other objects and advantages which will become subsequently apparent reside in the details of construction and operation as more fully hereinafter described and claimed, reference being had to the accompanying drawings forming part hereof, wherein like reference numerals refer to like parts throughout.

DETAILED DESCRIPTION OF THE INVENTION

Figure 1:
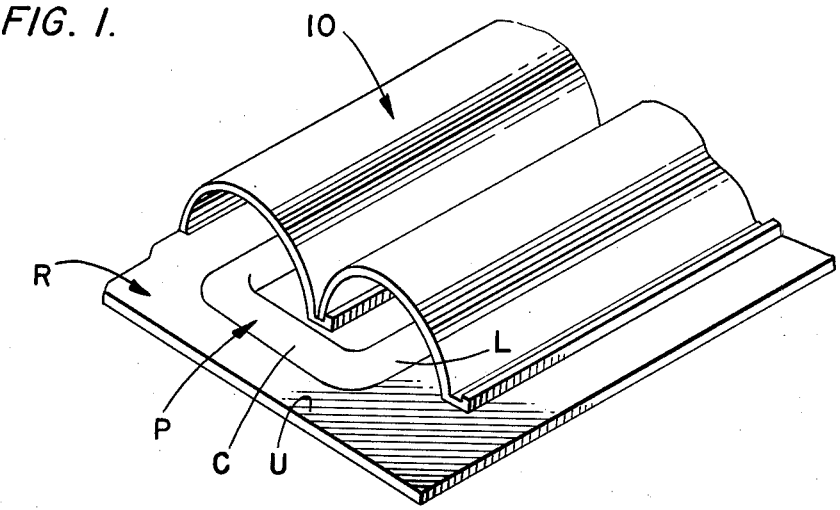
FIGS. 1-4 are perspectives of various solar focusing bodies comprising solar focusing means embodying the teachings of the present invention.

Shown in FIG. 1 is a portion of a roof bed R having a heat exchanger pipe P mounted on the upper surface U thereof. The heat exchanger pipe has heat exchange fluid, such as water, or the like flowing therethrough, and is part of a heat exchange system used in a building such as a house, apartment, commercial building, factory, or the like. The fluid flowing in the pipes P is heated by solar energy and exchanges that heat with suitable equipment for heating water, or the building itself, in ways which will occur to those skilled in the art from reading this disclosure. Heat can be given up by the fluid in the pipes P to the environment surrounding them in many instances, if so desired. On the upper surface of pipes P, semi-conductors converting solar rays to electricity may be placed for the conversion of solar energy in another form.

The pipes P include longitudinal pipes L and connecting pipes C which fluidly connect the ends of the longitudinal pipes together to define a continuous flow path through the piping system.

Figure 2:
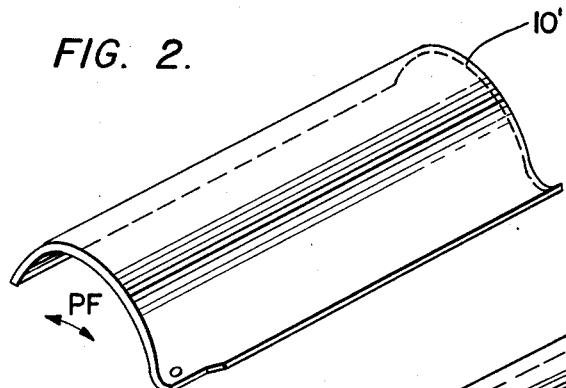
Figure 3:
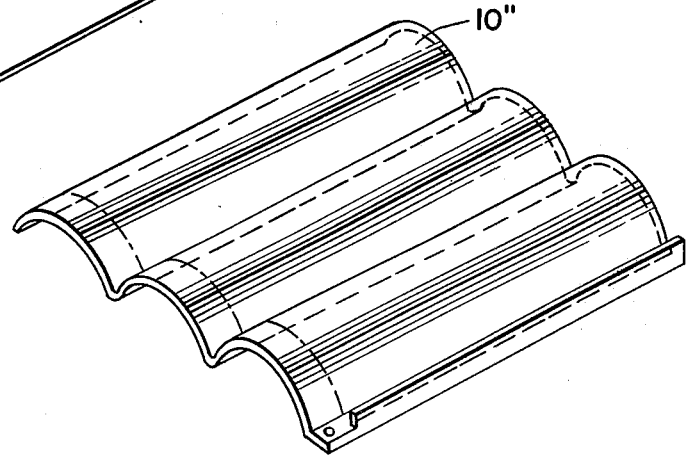
Figure 4:
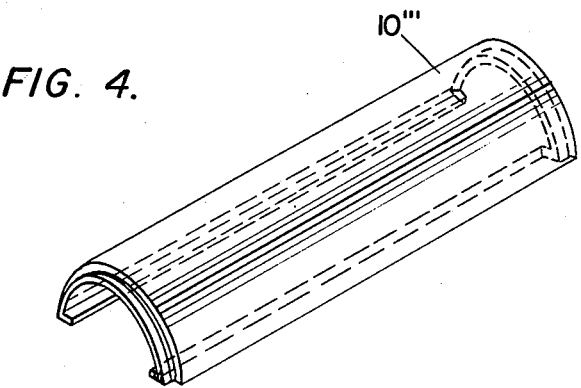
Figure 10:
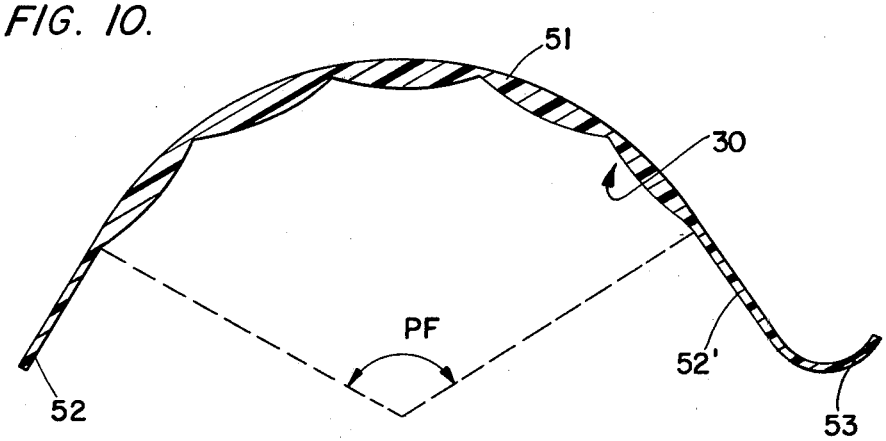

A plurality of solar energy focusing means 10 are mounted on the roof upper surface to straddle each longitudinal pipe L. The focusing means 10 are hollow, and elongate, and extend nearly the entire length of the longitudinal pipes, leaving just enough clearance at the ends thereof for the transverse connecting pipes C. The hollow inside of such focusing body provides confined air space. The total angle included by the transverse cross-section of each focusing means is about 180 degrees so that the focusing means forms about half of a plane figure, as will be described in more detail below. As shown in FIGS. 2 and 10, the portion of a plane figure PF may be materially less than 180 degrees.

Figure 5:
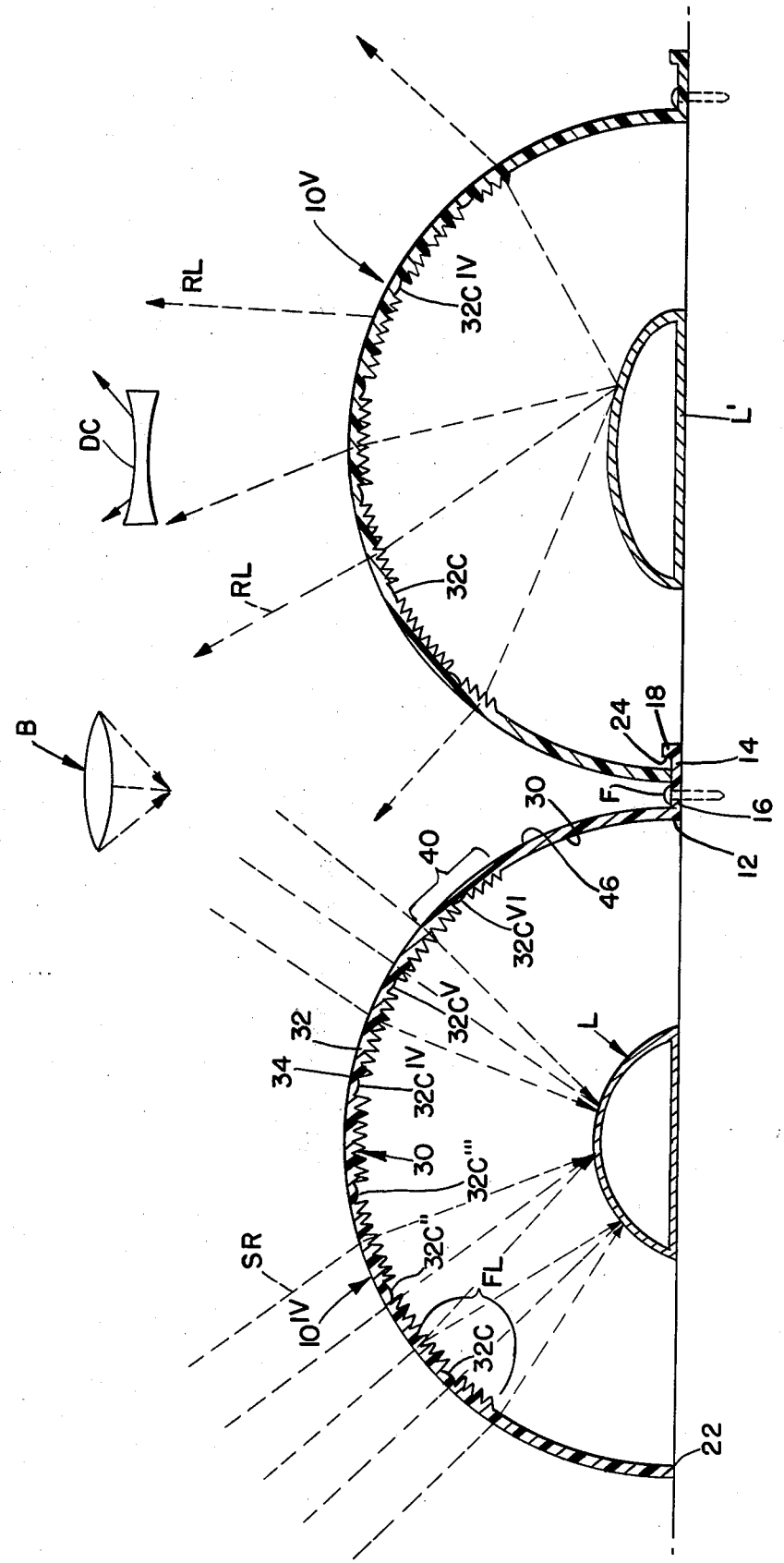
FIG. 5 shows interlocked solar focusing bodies with one form of certain fine menisci defined on the inside of the solar focusing bodies.

As best shown in FIG. 5, the solar focusing means each has a proximal longitudinal edge 12 having a mounting flange 14 integrally mounted thereon. The flange 14 includes a base 16 and a lip 18 extending upwardly therefrom. A fastener F, such as a nail, or the like, attaches the flange 14 to the roof bed to thereby attach the focusing means to the roof bed. As shown in FIG. 5, each focusing means has a distal longitudinal edge 22 which is received on the flange 14 of an adjoining collector adjacent, and preferably abutting, the inner surface 24 of the lip 18. In this manner, the solar focusing means are integrated into a roof as part thereof and function as roof tiles while each solar focusing means can, if desired, straddle and thereby enclose at least one longitudinal pipe L of the piping heat exchange system P. The solar focusing means are thus securely mounted on a roof bed and interconnected with each other and perform the function of roof tiles, if so desired.

As best shown in FIGS. 5 and 7-10, the inner surface 30 of the body of each solar focusing means or part thereof may be so grooved by a plurality of rulings 32, and areas $32c$, $32c''$, $32c'''$, $32c^{IV}$ and $32c^V$ to define a multiplicity of essentially parallel facets 34 which extend longitudinally of the focusing means. The facets are spaced to define an appropriate grating spacing, and the thickness of the solar collector is selected so that a plurality of Fresnel gratings, or plural Fresnel lenses 40, are formed by the solar focusing means. A single unit of a Fresnel lens is indicated by the bracket indicator FL.

Figure 6:
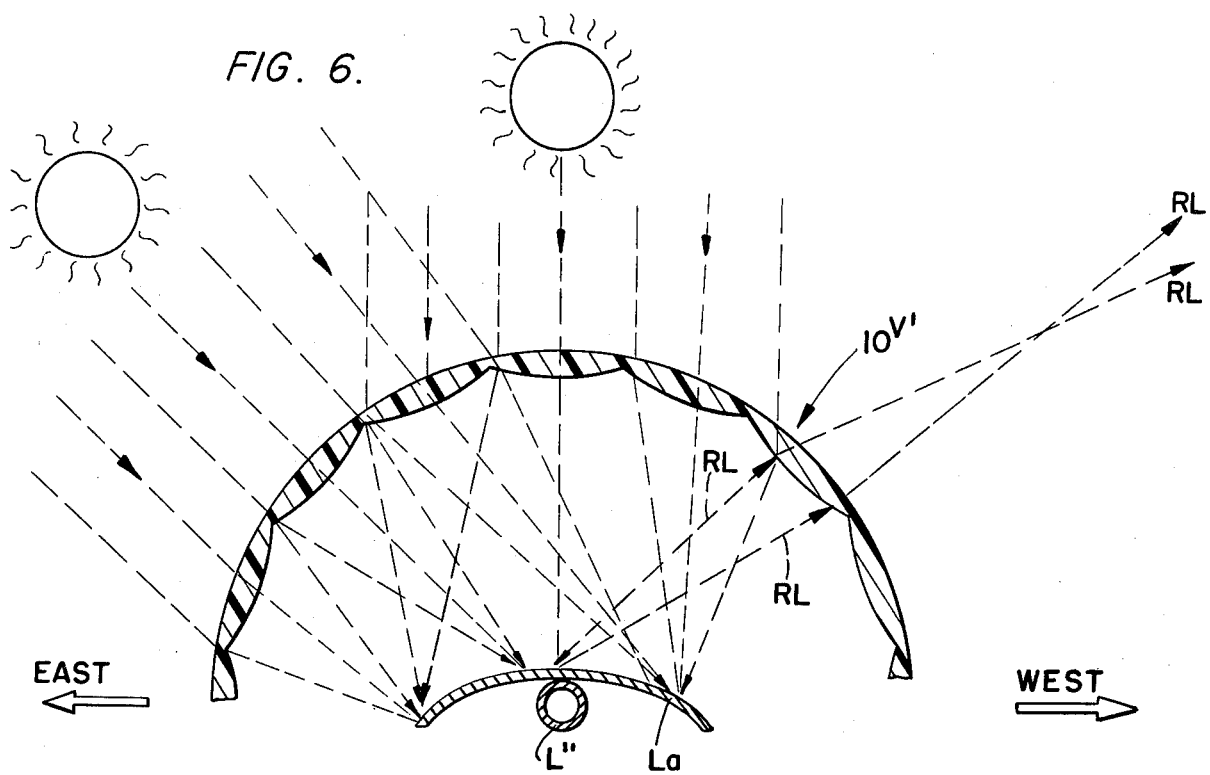
FIG. 6 is an elevation view showing another form of certain multiple menisci defined on the inside surface of the solar focusing body.

Each of the pipes L is located centering around the focuses of such lenses, and thus the lenses 40 focus incident solar rays SR onto the longitudinal pipes L as indicated for solar focusing means $10^{IV}$ in FIG. 5. The focusing means thus approximates a plurality of convex lenses, such as lens B, for incident solar rays. As indicated in FIG. 6, the inside surface of the focusing means may be so defined as to constitute a plurality of convex lenses for incident solar rays. In FIG. 6, pipe L'' has heat absorber La. The solar energy thus focused in multiple beams onto the pipes L'' heats the fluid contained therein.

Figure 7:
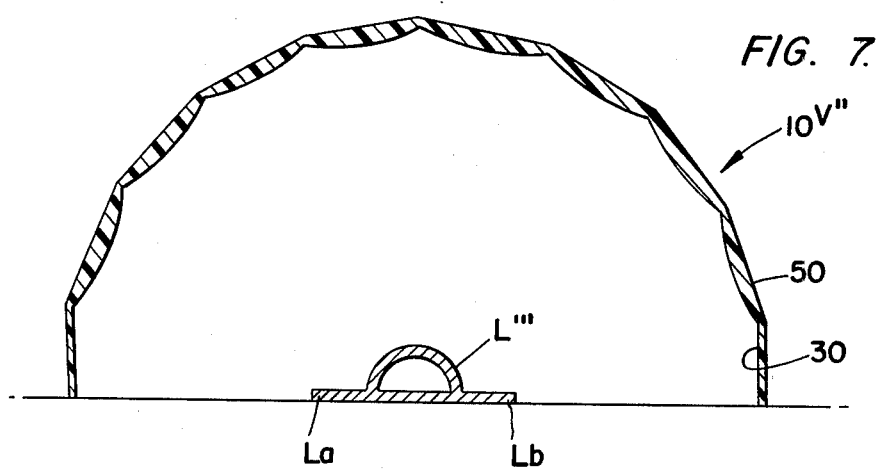
FIGS. 7-11 show alternative embodiments of the solar focusing means embodying the teachings of the present invention.

Thus, as indicated in FIGS. 6 and 7, no matter what position the sun assumes with respect to the focusing means, the convex nature of the lenses causes incident solar rays to be focused in multiple beams onto the pipes L'' and L''' to thereby heat the fluid flowing therethrough at all times during the sunshine hours. Thus, efficient heating of the heat transfer fluid is effected by the solar focusing means for the entire period of daylight.

The solar focusing means 10 constitute an aesthetically pleasing roof because of their semi-cylindrical or gutter-like shapes and the lenses defined therein. As just-discussed, for incident solar rays, in case the Fresnel lenses are defined on the focusing body, they act like double convex lenses to focus that energy onto the pipes L. However, for reflected light RL as indicated for the solar focusing means $10^V$ in FIG. 5, such Fresnel lenses 40 spread reflected light, indicated as DC in FIG. 5. Reflected light is thus dispersed and the rays scattered by the Fresnel lenses. In case focusing means such as convex lenses as shown in FIG. 6 are defined on the focusing body, reflected light is also dispersed outwardly for the point beyond the outer focus thereof, as indicated in FIG. 6.

The dispersal of light rays reflected from the pipes L gives the overall roof a uniform appearance having a color corresponding to the color of the pipes L. Thus, copper pipes will give the overall roof a copper hue when a building incorporating the solar collection focusing means herein described is viewed. The color of the focusing means is uniform over the outer surface 46 of the focusing means bodies and the overall roof can have the appearance of a Spanish-style roof, or the like. Of course, other colors for the pipes can be used without departing from the scope of the present disclosure.

The focusing means shown in FIG. 5 are semi-circular in transverse cross-section, but other shapes can be selected for the focusing means. Examples of such other shapes are shown in FIGS. 7–11. Thus, FIG. 7 shows a focusing means $10^{VII}$ comprising a multiplicity of planar sections 50 integrally edge coupled together to define an arcuate semi-cylindrical shape similar to the semicylindrical shape of the focusing means shown in FIGS. 1 and 5. The pipes L''' shown in FIG. 7 are also semi-cylindrical in shape and have fins Lb and La to act as heat absorbers, but other shapes can also be used for the pipes P without departing from the scope of the present disclosure.

Figure 8:
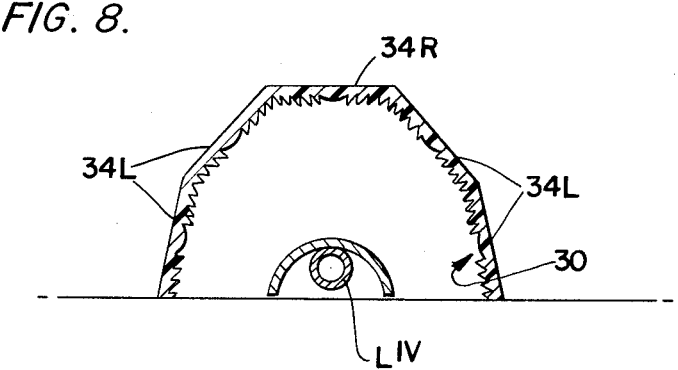

As indicated best in FIGS. 7 and 8, the focusing body may be defined so that facets 34L slope away from facet 34R on multi-sectional focusing means each having planar outer surfaces. The slope of the facets may be altered so the desired focusing operation can be obtained. The size, number, shape and relative orientation of the facets and grooves of the various focusing means disclosed herein can be set to obtain the desired results for focusing and reflecting light.

Figure 9:
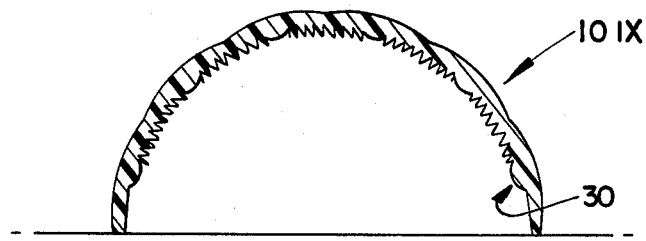

FIG. 9 shows a semi-cylindrical focusing means $10^{IX}$ wherein the focusing body is essentially semi-cylindrical and the focusing means are defined on both surfaces.

FIG. 10 shows a collector means having semi-planar portion 51 with the total angle PF of about 120 degrees and having planar portions 52 and 52', with smaller semi-planar portion 53.

Figure 11:
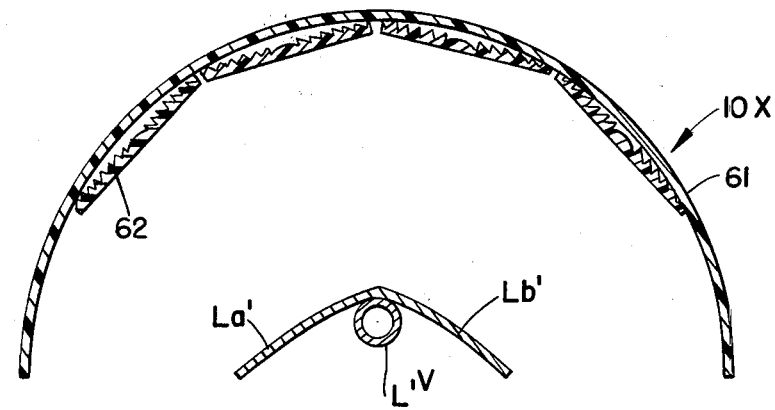

FIG. 11 shows another focusing means $10^X$ implementing the present invention, wherein a multiple number of lenses 62 are attached to a surface cover 61 in a semi-cylindrical shape so that a multiple focusing body is comprised of a transparent cover and multiple lenses attached to it in a centripetal form.

The pipes L through $L^{IV}$ can be used with any of the focusing means shown if so desired.

The Fresnel gratings on the focusing means can be ruled or formed according to methods known to those skilled in the art. Such methods are described in *Light*, by R. W. Ditchburn, published by Blackie and Son Limited in 1967 (copyright 1963). Other methods also can be used to form the gratings on the surfaces of the focusing means. It is noted that the just-referenced Ditchburn text also discusses the theory of Fresnel deflection and lenses, and attention is directed thereto for such discussion.

As this invention may be embodied in several forms without departing from the spirit or essential characteristics thereof, the present embodiments are, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A solar energy focusing means comprising: a hollow solar energy focusing body, having a transverse cross-section which includes a substantial fraction of a plane figure, said focusing body straddling a portion of a solar energy conversion device so that solar energy is incident upon said focusing body prior to being incident upon such conversion device portion;

a multiplicity of fine menisci defined in said solar energy focusing body to be in a plurality of groups with spacing between said groups, said menisci being ground and angled to define a plurality of biconvex lenses for incident solar energy and a plurality of biconcave lenses for solar energy which is reflected from said solar energy conversion device, said plurality of bi-convex lenses having a plurality of focuses on said focusing body to focus incident solar rays in multiple beams onto such conversion device portion in the manner of convex lenses, said multiple focuses applying multiple focused beams onto the solar energy conversion device at all times irrespective of the position of the sun so that the sun need not be tracked, said concave lenses dispersing said reflected solar energy so that said focusing body has an outward overall coloring corresponding to the coloring of such conversion device portion straddled by said focusing body.

2. The solar energy focusing means defined in claim 1, wherein the upper part of such focusing body has about one-third of a plane figure and the lower part thereof is an extension of such plane figure in any desired form.

3. The solar energy focusing means defined in claim 1, wherein said plane figure is about one-half of a circle so that said focusing body is approximately semi-cylindrical in shape.

4. The solar energy focusing means defined in claim 1, wherein said plane figure is arcuate.

5. The solar energy focusing means defined in claim 1, wherein said plane figure is centripetally multi-sided.

6. The solar energy focusing means defined in claim 1, wherein the solar energy conversion device includes a fluid flow pipe of semi-cylindrical shape.

7. The solar energy focusing device of claim 1, wherein said convex lenses are defined on said focusing body.

8. The solar energy focusing device of claim 1, wherein said convex lenses are attached to said focusing body.

9. The solar energy focusing means of claim 1 wherein the solar energy conversion device includes a fluid flow pipe with solar energy absorbing means thereon.

10. The solar energy focusing means defined in claim 1, wherein said solar energy focusing body has a shape similar to that of a Spanish roof tile.

11. The solar energy focusing means defined in claim 1, further including fastening means for attaching said focusing means to a roof bed of a building.

12. The solar energy focusing means defined in claim 11, wherein said fastening means includes a flange on one longitudinal edge of said focusing body with another longitudinal edge of said focusing body being free, said free edge of one body being received in said flange of an adjacent body to interlock the two adjacent bodies together.

* * * * *